United States Patent
Nimtsch et al.

(10) Patent No.: US 10,571,249 B1
(45) Date of Patent: Feb. 25, 2020

(54) OPTICAL MEASURING DEVICE AND METHOD

(71) Applicant: PRECITEC OPTRONIK GMBH, Neu-Isenburg (DE)

(72) Inventors: Philipp Nimtsch, Gießen (DE); Simon Mieth, Frankfurt (DE)

(73) Assignee: PRECITEC OPTRONIK GMBH, Neuisenburg (DE)

( * ) Notice: Subject to any disclaimer, the term of this patent is extended or adjusted under 35 U.S.C. 154(b) by 0 days.

(21) Appl. No.: 16/518,353

(22) Filed: Jul. 22, 2019

(30) Foreign Application Priority Data

May 27, 2019 (DE) .......................... 10 2019 114 167

(51) Int. Cl.
*G01B 11/06* (2006.01)
*G01B 9/02* (2006.01)
*G01B 11/02* (2006.01)

(52) U.S. Cl.
CPC ...... *G01B 11/0675* (2013.01); *G01B 9/02021* (2013.01); *G01B 11/026* (2013.01); *G01B 11/0608* (2013.01); *G01B 11/0625* (2013.01); *G01B 2210/56* (2013.01)

(58) Field of Classification Search
CPC ............ G01B 11/0675; G01B 11/0625; G01B 11/0608; G01B 11/026; G01B 2210/56; G01B 9/02021
See application file for complete search history.

(56) References Cited

U.S. PATENT DOCUMENTS

| | | | |
|---|---|---|---|
| 9,335,145 B2 | 5/2016 | Sonntag | |
| 2014/0368830 A1* | 12/2014 | Michelt | G01B 11/0608 356/485 |
| 2015/0260504 A1* | 9/2015 | Schonleber | G01B 9/02091 356/478 |
| 2017/0299376 A1* | 10/2017 | Fresquet | G01B 9/0203 |
| 2018/0364028 A1* | 12/2018 | Piel | G01B 9/02044 |

FOREIGN PATENT DOCUMENTS

WO    WO2012139571 A1    10/2012

* cited by examiner

*Primary Examiner* — Dominic J Bologna
(74) *Attorney, Agent, or Firm* — Lempia Summerfield Katz LLC

(57) ABSTRACT

The invention relates to a device for optical measurement of a thickness of an intransparent layer on a substrate, comprising first means for optical distance measurement configured to measure a first distance between a first reference plane and a first surface of the intransparent layer, and second means for optical distance measurement configured to measure a second distance between a second reference plane and a second surface of the intransparent layer. The second means measures a third distance between the second reference plane and a surface of the substrate. The thickness of the intransparent layer is computed from the first distance and the second distance. The measurement of the third distance is used to take into account the influence of the optical effect of the substrate on the distance measurement of the second distance. The invention also relates to a method for optical measurement of a thickness of an intransparent layer on a substrate.

9 Claims, 3 Drawing Sheets

OPTICAL MEASURING DEVICE AND METHOD

CROSS-REFERENCE TO RELATED APPLICATIONS

This application claims benefit of German Patent Application DE 10 2019 114 167.2 filed May 25, 2019. The contents of this earlier application is hereby incorporated by reference in its entirety.

BACKGROUND OF THE INVENTION

1. Field of the Invention

The invention relates to a device for optical measurement of a thickness of an intransparent layer on a substrate.

2. Related Art

A thickness measurement by means of distance measurement on both sides is known as prior art for intransparent layers, for example, using a chromatic-confocal measuring method or an interferometric measuring method. Such a device is known, for example, from WO 2012/139571A1. During the measurement on both sides, a distance value of a surface of the layer in relation to a reference plane is ascertained in each case by means of two measuring heads and the thickness of the layer is computed from the two distance values.

If the intransparent layer rests on a substrate, the refraction properties of the substrate thus influence the measured value of the distance measurement carried out through the substrate. This can result in a corruption of the thickness measurement.

SUMMARY OF THE INVENTION

The object of the invention is therefore to enable an optical layer thickness measurement of an intransparent layer, which rests on a transparent substrate, with sufficient accuracy.

An intransparent layer is understood in this case as a material layer, which does not enable a (distance) measured value to be obtained of the boundary surface averted from the direction of incidence of the radiation using the radiation employed for the optical measurement (preferably light in the visible or infrared spectrum). The measurement of the averted boundary surface may not be possible in this case because of inadequate transmission of the radiation, or diffusion occurs in the material, for example, which corrupts the measurement. The transparent substrate is accordingly to be understood as a material substantially transparent to the employed radiation.

The above-mentioned object is achieved with respect to the measuring device by a first means for optical distance measurement, which is configured for measuring a first distance between a first reference plane and a first surface of the intransparent layer. In addition, the measuring device comprises a second means for distance measurement, which is configured for measuring a second distance between a second reference plane and a second surface of the intransparent layer.

According to the invention, the second means for optical distance measurement is also configured to measure a third distance between the second reference plane and a surface of the substrate. The measuring device is configured to compute the thickness of the intransparent layer from the first distance and the second distance in consideration of the (known) distance between the reference planes, wherein the measurement of the third distance is used to factor in the optical effect of the substrate on the distance measurement of the second distance.

The optical effect of the substrate originates from the fact that the substrate has an index of refraction n>1. The propagation of the light in the substrate therefore differs from the propagation in air and/or vacuum. The changed properties of the light in the medium (change of the beam angle, discrepancy between optical and geometric path length, changed speed of light) have an effect on the measurement result in the optical distance measuring and have to be taken into consideration to remove a corruption of the measurement result.

Therefore, if the intransparent layer rests on a substrate, the thickness of the substrate has to be precisely known and/or calibrated out. In the event of unknown thickness of the substrate or a variation of the thickness of the substrate, inaccuracy therefore arises in the layer thickness measurement of the intransparent layer.

This is the case in particular if the variation of the thickness of the substrate in relation to a target value or mean value is greater than the desired accuracy when determining the thickness of the intransparent layer. For example, a change of the thickness of the substrate by 50 μm at an index of refraction of n=1.5 results in a change of the optical path length of a light beam on a path from one side of the substrate to the opposite side of the substrate by 25 μm.

If the distance measurement between a reference plane and a surface of the intransparent layer is carried out, for example, with the aid of an interferometric distance measurement and the measurement light is transmitted through the substrate in this case before and after the reflection on the surface of the intransparent layer, the change of the optical path length of 25 μm results in an apparent distance change, without the actual distance changing.

If this effect is not corrected, the thickness change of the substrate thus results overall in an apparent change of the thickness of the intransparent layer of 25 μm. This inaccuracy is inadequate for the measurement if, for example, an accuracy of 10 μm is required when determining the thickness of the intransparent layer.

The features of the invention have the advantage that the thickness of the substrate can be determined so that the inaccuracy originating from the optical properties of the substrate is significantly reduced. It is even possible using the features of the invention to determine the thickness of the substrate precisely at the point of the thickness measurement of the intransparent layer, so that variations of the thickness of the substrate are also taken into consideration.

The first optical means for distance measuring is preferably based on the chromatic-confocal measurement principle. In chromatic-confocal distance measurement, a measuring head is used which contains a chromatically uncorrected optical unit, which focuses the measurement light on the surface of the measurement object. As a result of the chromatic length aberration of the optical unit, the spectral components of the light are focused in different focal planes. A confocal aperture ensures that only the spectral component of the measurement light, the focal plane of which is located exactly on the surface, can reach a spectrograph and can be spectrally analyzed therein. By analysis of the spectral signal according to methods known per se, the first distance between the first reference plane and the first surface of the intransparent layer can be ascertained.

The use of the chromatic-confocal measuring principle has the advantage that the first distance can be determined with sufficiently good accuracy such that it provides a robust method, and it represents a more cost-effective solution, for example, in relation to interferometric distance measuring.

The first light source, which provides measurement light for the first optical means for distance measuring, preferably emits a continuous spectrum in this case. The emitted spectrum is particularly preferably in the range of visible light or in the infrared range.

The second optical means for distance measurement is preferably based on the interferometric measuring method. In distance measurement using the interferometric measuring method, measurement light which is reflected by a measurement object interferes with measurement light which was reflected in a reference arm by at least one first reference mirror. The reflected measurement light is spectrally modulated by the interference, wherein the desired distance value is derivable from the modulation frequency. The location of the first reference mirror advantageously defines a reference plane in this case, to which the distance measurement relates. The use of an interferometric measuring method for the second optilo cal means for the distance measurement has the advantage that the measurement at the boundary surface between substrate and intransparent layer is corrupted less by the properties of the intransparent layer (for example, scattering, color) than in the case of a chromatic-confocal measurement.

The second light source, which provides measurement light for the second optical means for distance measurement, preferably emits a continuous spectrum in this case. The emitted spectrum is particularly preferably in the range of visible light or in the infrared range. In one preferred embodiment of the invention, the reference arm only comprises a first reference mirror. For the measurement of the third distance, the modulation signal from the interference of light which was reflected by the surface of the substrate facing toward the second optical means for distance measurement and light which was reflected by the first reference mirror is analyzed. For the measurement of the second distance, the modulation signal from the interference of light which was reflected by the second surface of the intransparent layer (boundary surface between intransparent layer and substrate) and light which was reflected by the first reference mirror is analyzed. The index of refraction of the substrate and the thickness of the substrate are advantageously taken into consideration in this case, as explained hereafter. A direct measurement of the substrate thickness is optionally carried out by a modulation signal from the interference of light which was reflected by the surface of the substrate facing toward the second optical means for distance measurement and light which was reflected by the second surface of the intransparent layer being analyzed.

In a further preferred embodiment of the invention, the light is split in the reference arm, so that a first part of the light is conducted to a first reference mirror and a second part of the light is conducted to a second reference mirror, wherein the optical path lengths of the light reflected by the first reference mirror and the light reflected by the second reference mirror differ.

The use of two reference mirrors is advisable in particular if the measurement range of the interferometric distance measurement is sufficiently small that the optical path length difference between the light reflected by the second surface of the intransparent layer and the light reflected by the first reference mirror is greater than the maximum measurable optical path length difference.

Using this arrangement having two reference mirrors, it is possible to determine the second and third distances simultaneously with better precision. The precision is typically better the smaller the measurement range is (measurement errors approximately proportional to the maximum measurable optical path length difference). If the intransparent layer is, for example, one to two orders of magnitude thinner than the substrate, it can thus be that a means for optical distance measurement, the measurement range of which comprises the entire substrate, has a measurement error which is of the same order of magnitude as the intransparent layer. In this case, it is advantageous to use a second means for optical distance measurement, which has a smaller measurement range and comprises two reference mirrors as described.

There are multiple advantageous options for the splitting of the light in the reference arm. In one particularly preferred embodiment, the light is conducted via a beam splitter (for example, beam splitter cube), which conducts one part of the light in various directions onto the first and second mirror, respectively. In an alternative particularly preferred embodiment, the first reference mirror is partially transmissive, whereby a first part of the light is directly reflected by the first reference mirror and a second part of the light is incident through the first reference mirror on the second reference mirror and is reflected thereby.

In one particularly preferred embodiment, the reference arm comprises a glass pane, wherein a first part of the light is reflected at a first surface of the glass pane and a second part of the light is transmitted through the glass pane and is reflected by a second surface of the glass pane. The first and second surfaces of the glass pane thus act as the first and second reference mirrors. The optical path length difference between the light reflected by the first surface and the light reflected by the second surface is defined in this case by the thickness of the glass pane, i.e., the distance between the first and second surfaces of the glass pane, and by the index of refraction of the glass.

The reflection, i.e., the component of the light reflected on the first and second surfaces, may advantageously be changed in each case by coatings of one of the surfaces or both surfaces. The reflection may be increased, for example, (in relation to an uncoated surface) by reflective layers, while the reflection may be reduced by antireflective coatings. In particular, the intensities of the light reflected by the first surface and the light reflected by the second surface may be adapted so that optimum conditions result for the measurement. This can be advisable in particular if the intensities of the light reflected by the second surface of the intransparent layer and the light reflected by the surface of the substrate differ.

The reflection of the first reference mirror (in particular first surface of the glass pane) and the second reference mirror (in particular second surface of the glass pane) are particularly preferably set by coating so that the strengths of the interference signals differ, which can advantageously be used for assigning the reference signals.

In one particularly preferred embodiment, the glass pane has a similar thickness and similar dispersion properties as the substrate. In this case, the optical path length difference between light reflected by the first surface of the glass pane and light reflected by the second surface of the glass pane is similar to the optical path length difference between light reflected by the second surface of the intransparent layer and light reflected by the surface of the substrate. The thickness of the glass pane is advantageously of the same order of magnitude as the thickness of a typical substrate to be measured, in particular, the thickness of the glass pane is between 0.5 times and 2 times as thick as an average substrate to be measured.

A possible dependence of the optical path length of the light during the transmission through the substrate, which can result in measurement inaccuracies, is substantially compensated for in this case by a similar dependence of the optical path length of the light during the transmission through the glass pane in the reference arm.

For the measurement of the third distance value, in this case the modulation signal from the interference of light which was reflected by the surface of the substrate and light which was reflected by the first reference mirror is analyzed. In the same manner, the modulation signal from the interference of light which was reflected by the second surface of the intransparent layer (boundary surface between intransparent layer and substrate) and light which was reflected by the second reference mirror is analyzed for the measurement of the second distance value. The index of refraction of the substrate and the thickness of the substrate are advantageously taken into consideration in this case, as explained hereafter.

For an accurate determination of the thickness of the intransparent layer, in addition to the distances between the first reference plane and the first surface of the intransparent layer and between the second reference plane and the second surface of the intransparent layer, the distance between the first and the second reference plane also has to be accurately known.

A means for calibrating the distance between the first and the second reference planes is advantageously used to calibrate the device. The calibration can be used in particular to detect changes of the distance between the first and the second reference plane, which are induced, for example, by temperature changes, at regular intervals and thus to enable a correction of the measured values.

This is preferably a calibrating body of known thickness. An object, the thickness of which is very accurately known and which can be provided, for example, in the form of a glass pane or a metal body, can be used as a calibrating body in this case. The calibrating body is introduced instead of the measurement object into the measuring device and a measurement is carried out. The distance between the first and the second reference planes can be ascertained in this case from the known thickness of the calibrating body and the measured distances between the first reference plane and a first surface of the calibrating body and the distance between the second reference plane and a second surface of the calibrating body.

The thickness of the calibrating body is preferably similar to the thickness of the intransparent layer to be measured.

In a further preferred embodiment, the calibrating body rests on a substrate which has a similar thickness and similar dispersion properties as the substrate, on which the intransparent layer to be measured rests.

In an alternative preferred embodiment of the invention, the calibrating body solely consists of a transparent material, for example, the substrate without the intransparent layer. In this embodiment, a distance between a first surface of the calibrating body facing toward the first means for optical distance measurement and the first reference plane is determined using the first means for optical distance measurement and a distance between the same first surface of the calibrating body and the second reference plane is determined using the second means for optical distance measurement. The distance between the first and second reference planes results from the total of the two distances.

The distance measurement with the aid of the first and the second optical means for distance measurement is based on measurement light which is reflected in each case by a surface to be measured, wherein the origin of the reflected light is located in a determined measurement point or in an area around a determined measurement point on the surface to be measured.

The measurement points on the first and second surfaces of the intransparent layer and on the surface of the substrate are advantageously located on a line which is approximately perpendicular to the three mentioned surfaces. The optical means for distance measurement measure on opposing sides of the intransparent layer and/or the substrate.

The location of the measurement point is dependent in this case on the position of the measuring heads. One of the two measuring heads may advantageously be displaced in at least one direction which is orthogonal in relation to the first and second surfaces of the intransparent layer and/or in relation to the surface of the substrate.

To align the measuring heads, the amount of light which is generated by a first light source and is emitted by a first measuring head and is received by a second measuring head and conducted to a second detector can be measured in the absence of a measurement object. The amount of light is maximal when the measurement points are located on a line as described above.

It is preferably also possible using the construction according to the invention to perform measurements on different types of samples. For example, in the case of samples in which the layer on the substrate is at least partially transparent to the radiation of the first or second means for optical distance measurement, a direct measurement of the layer thickness can be carried out either by the first or second means for optical distance measurement. Classical two-sided measurements can also be carried out on intransparent samples without substrate, without having to adapt the device. This has the advantage that a plurality of different samples can be measured using the device according to the invention.

The invention also relates to a method for optical measurement of a thickness of an intransparent layer on a substrate. For this purpose, firstly a first distance between a first reference plane and a first surface of the intransparent layer is measured and also a measured value which corresponds to an optical distance value between a second reference plane and a second surface of the intransparent layer. Moreover, a third distance is measured between a second reference plane and a surface of the substrate. The measured values are used to compute a geometrical second distance between a second reference plane and the second surface of the intransparent layer, in consideration of the measured value, the third distance, and an index of refraction of the substrate. Subsequently, a layer thickness of the intransparent layer is determined from the first distance and the second distance and a calibration variable.

A calibration is preferably carried out by measuring a calibration body of known thickness using the method according to the invention. In this manner, the calibration variable may be determined and used for measurements of measurement objects. A calibration is particularly preferably carried out repeatedly, for example, at regular time intervals or if there is reason to assume that the calibration has changed (displacement of individual components of the system, temperature change, etc.).

BRIEF DESCRIPTION OF THE DRAWINGS

In the figures.

DETAILED EXPLANATION OF PREFERRED EMBODIMENTS

Figure 1:
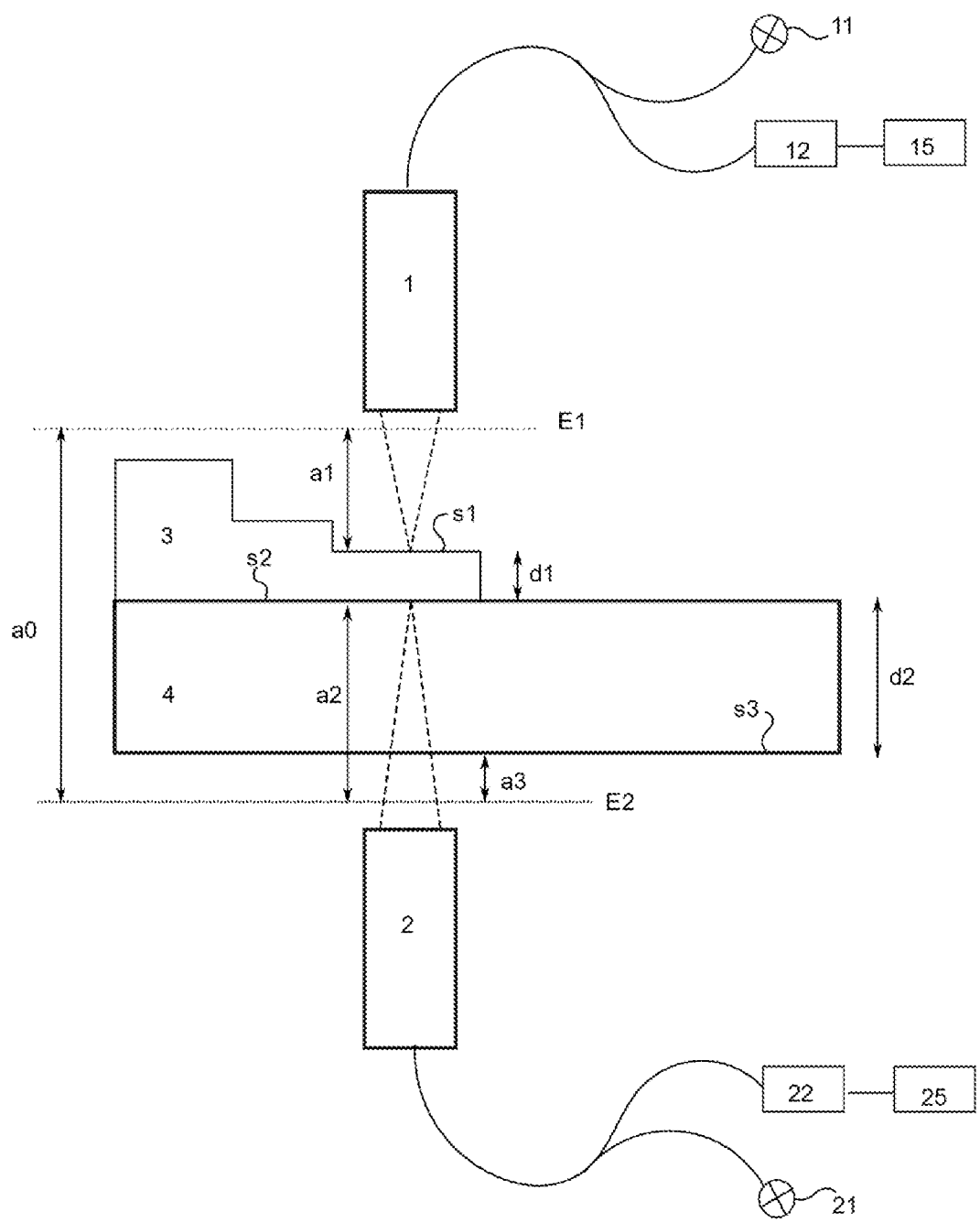
FIG. 1 shows an exemplary measuring device.

FIG. 1 schematically shows an embodiment of the measuring device according to the invention described here. A first optical means for distance measurement comprises a first light source 11 and a first measuring head 1, which conducts measurement light generated by the first light source onto a first surface s1 of the intransparent layer 3 and receives light reflected by this surface s1 and conducts it to a first detector 12 having at least one light-sensitive element.

The first light source preferably emits a continuous spectrum. The emitted spectrum is particularly preferably in the range of visible light or in the infrared range.

The first detector generates an electric signal, which is used by a first analysis unit 15 to determine a first distance a1 between a first reference plane E1 and the first surface of the intransparent layer 3.

The measuring device furthermore comprises a second optical means for distance measurement having a second light source 21 and a second measuring head 2, which conducts measurement light generated by the second light source 21 onto a second surface s2 of the intransparent layer 3 (boundary surface between intransparent layer 3 and substrate 4) and onto a surface s3 of the substrate 4. The measuring head receives light reflected by the second surface s2 of the intransparent layer 3 and light reflected by the surface s3 of the substrate 4 and conducts it onto a second detector 22 having at least one light-sensitive element. The second measuring head 2 is arranged on the side of the measurement object (inn transparent layer 3 and substrate 4) opposite to the first measuring head 1.

The second light source preferably emits a continuous spectrum. The emitted spectrum is particularly preferably in the range of visible light or in the infrared range.

The second detector 22 generates an electric signal, which is used by a secand analysis unit 25 to determine a second distance a2 between a second reference plane E2 and the second surface s2 of the intransparent layer 3 and a third distance a3 between the second reference plane E2 and the surface of the substrate s3.

The points on the surfaces s1, s2, and s3, by which light is reflected, are advantageously located on a line which is approximately perpendicular to the surfaces s1, s2, and s3. The optical means for distance measurement measure on opposing points of the intransparent layer 3 or the substrate 4, respectively.

The measurement light reflected by the second surface s2 of the intransparent layer 3 is influenced during the transmission through the substrate 4 because of the optical effect (index of refraction n>1) of the substrate 4, which has an effect on the measurement signal and corrupts the measurement of the distance a2 and thus results in measurement inaccuracies. To obtain the geometric distance, the index of refraction and the geometry of the individual material sections on the optical path have to be taken into consideration.

The measurement of the distance a3 is used to correct the influence of the optical effect of the substrate on the measurement signal by computation. Since the light reflected by the surface s3 of the substrate 4 does not pass through the substrate, the distance value a3 can be determined with high accuracy without computational corrections. In particular, the measurement of the distance a3 can be used to ascertain the thickness d2 of the substrate.

The measured distance value mw2 between the second reference plane E2 and the second surface of the intransparent layer—which differs because of the optical effect of the substrate from the actual distance value a2—is given by a measured value of the second means for optical distance measurement (mw2):

$$mw2 = a3 + f(d2, n)$$

wherein f is a known function reversible according to d2 as a function of a thickness of the substrate d2 and the index of refraction of the substrate n.

The measured value mw2 corresponds to an optical distance value between a second reference plane E2 and a second surface s2 of the intransparent layer.

The measured value is corrupted because of the optical effect of the substrate 4. The actual distance value a2 results as the total of the measured distance value a3 and the unknown thickness d2 of the substrate:

$$a2 = a3 + d2$$

To be able to correct the optical effect of the substrate on the distance measurement of the distance a2 by computation, the measured distance value for the distance a3 is used:

$$a2 = a3 + f^{-1}(mw2 - a3, n)$$

wherein the index of refraction n is known.

The thickness of the intransparent layer d1 results from the measured distances a1 and a2 and from the distance a0 between the first and second reference planes:

$$d1 = a0 - a1 - a2$$

The distance between the reference planes is either known or can be ascertained by calibration measurement of a layer of known thickness d_kali:

$$a0 = d\_kali + a1(kali) + a2(kali)$$

Figure 2:
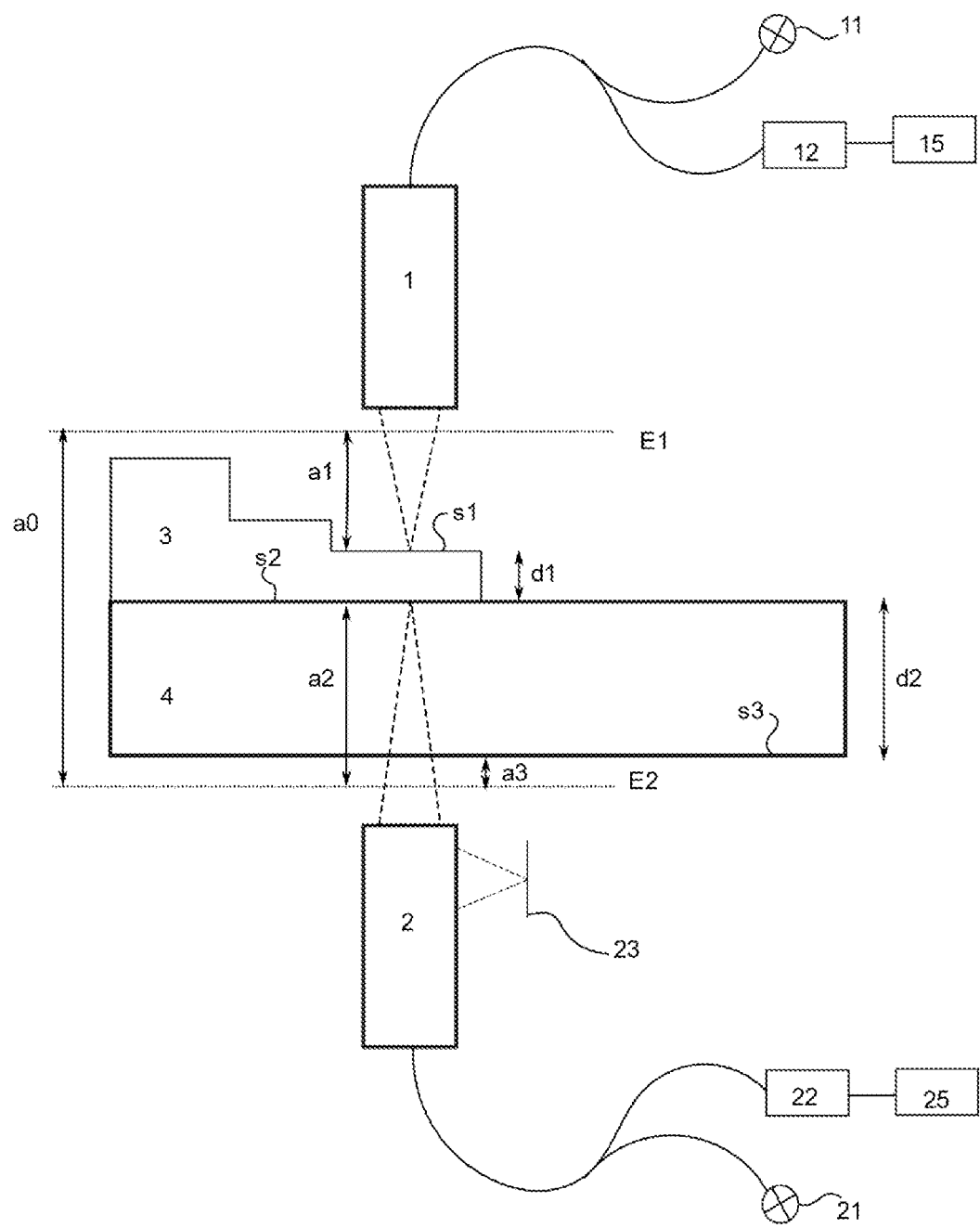
FIG. 2 shows a second exemplary measuring device.

FIG. 2 schematically shows an embodiment based on FIG. 1, in which the second means for optical distance measurement is based on the principle of is interferometric distance measurement. The polychromatic measurement light generated by a second light source 21 is split in this case into object light and reference light. The splitting is advantageously carried out by means of a beam splitter. A second measuring head 2 conducts the object light onto a second surface s2 of the intransparent layer 3 and onto a surface s3 of the substrate 4 and receives the object light reflected by the second surface s2 of the intransparent layer 3 and the object light reflected by the surface s3 of the substrate.

The object light can be focused in this case onto the second surface of the intransparent layer s2. The lower reflectance in the case of the reflection of the object light on the second surface of the intransparent layer can thus be counteracted, which occurs if the indices of refraction of the intransparent layer and the substrate only differ slightly.

The reference light is conducted onto a first reference mirror 23. The object light reflected by the second surface of the intransparent layer s2 and the object light reflected by the surface of the substrate s3 is overlaid with the reference light reflected by the first reference mirror 23 and conducted onto a detector 22. The detector 22 comprises a plurality of light-sensitive cells, which measure the interference signal from the superposition of object light and reference light in a spectrally resolved manner. According to methods known per se, the measured values (path differences between object light and reference light) are concluded from the modulation of the intensity over the spectrum.

With respect to the distance measurement of the distance a3, the interferometric measurement supplies as a result an optical path length difference between the object light, which is reflected by the surface s3 of the substrate 4, and the reference light, which is reflected by the first reference mirror 23. The position of the first reference mirror 23 advantageously defines in this case the location of the second reference plane E2: if the surface of the substrate s3 is located in the second reference plane E2, the optical path length difference between object light and reference light is precisely zero.

The distance a3 between the second reference plane E2 and the surface of the substrate s3 is identical in this case to the optical path length difference between the second reference plane E2 and the surface of the substrate s3, since all optical routes extend in air, i.e., in a medium having an index of refraction of approximately 1.

The measured optical path length difference between the second reference plane E2 and the second surface of the intransparent layer s2 is given by the measured value mw2:

$$mw2=a3+d2*n$$

Because of the index of refraction n>1 of the substrate 4, the geometric distance value a2 is not identical to the measured optical path length difference mw2, i.e., the measured value is corrupted because of the optical effect of the substrate 4. To be able to correct the optical effect of the substrate 4 on the distance measurement of the distance a2 by computation, the measured distance value for the distance a3 is used:

$$a2=a3+(mw2-a3)/n$$

wherein the index of refraction n is known.

The distance value a1 between the first reference plane E1 and the first surface s1 of the intransparent layer 3 is determined by the first means for optical distance measurement, as described above in reference to FIG. 1.

The first means for optical distance measurement is preferably a chromatic-confocal means for distance measurement or an interferometric means for distance measurement.

The thickness of the intransparent layer d1 may in turn be computed according to $$d1=a0-a1-a2.$$

Figure 3:
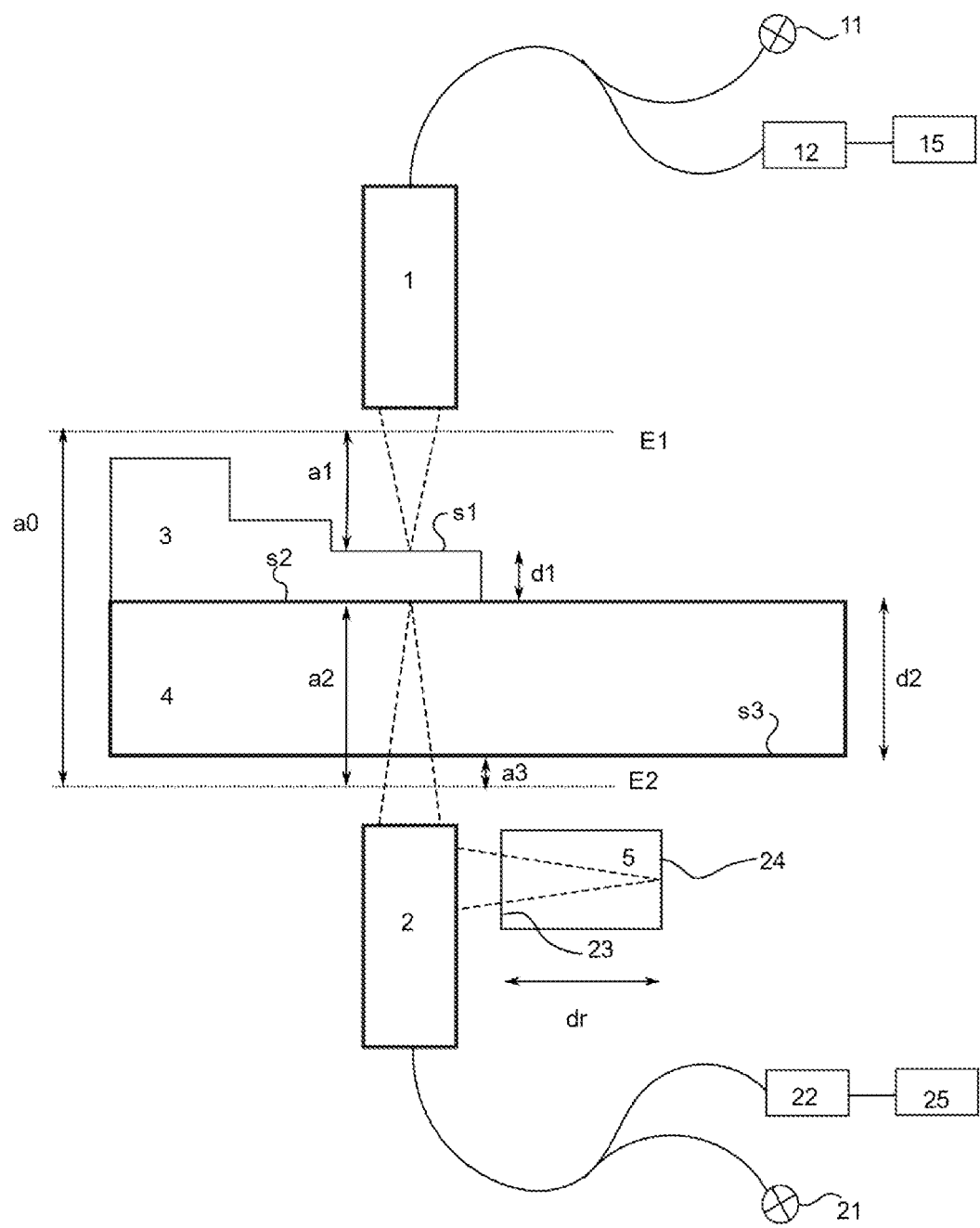
FIG. 3 shows a third exemplary measuring device.
Identical reference signs are used in each case for identical parts.

FIG. 3 schematically shows a further embodiment, wherein a second optical means is embodied for distance measurement of the distances between a second reference plane E2 and a second surface s2 of the intransparent layer 3 and also between the second reference plane E2 and a surface s3 of the substrate 4 as an interferometric distance measurement as in FIG. 2.

In the embodiment shown in FIG. 3, an interferometric distance measurement having a small measurement range is used, in particular having a measurement range for which the maximum measurable optical path length difference is less than the optical path length difference to be determined between the second reference plane E2 and the second surface s2 of the intransparent layer 3.

This is the case in particular if the optical thickness n*d2 of the substrate is greater than the maximum measurable optical path length difference of the interferometric distance measurement. The use of an interferometric distance measurement having smaller measurement range is advantageous to improve the accuracy of the distance measurement.

The reference light is split to measure the distance d2; one part of the reference light is conducted in this case onto a first reference mirror 23 and a further part is conducted onto a second reference mirror 24, wherein the optical path length of the light reflected by the second reference mirror 24 is greater by a value r than the optical path length difference of the light reflected by the first reference mirror 23.

The first and second reference mirrors are advantageously embodied as surfaces of a glass pane 5. A part of the reference light is reflected in this case by a first surface of the glass pane, which therefore acts as a first—partially transmissive—reference mirror. A second part of the reference light is transmitted by the glass pane and reflected by a second surface of the glass pane, which acts as a second reference mirror. In this case, the optical path length difference r is given by the thickness dr and the index of refraction nr of the glass pane:

$$i \cdot r = nr * dr$$

The reflectance of the two surfaces and thus the two reference mirrors may be varied in a broad range in this case by means of suitable coatings. It is thus possible to achieve, for example, the distance signal for measuring the distance a2 being significantly stronger than the distance signal for measuring the distance a3, which facilitates an unambiguous assignment of the distance signals.

If a glass pane is not used in the reference arm, the optical path length difference r between the reference mirrors thus results directly from the distance thereof in relation to one another.

The measurement of the distance a3 takes place similarly to the embodiment shown in FIG. 2. For the measurement of the distance value a2, object light reflected by the second surface s2 of the intransparent layer 3 is overlaid with reference light reflected by the second reference mirror 24 and conducted onto the second detector 22.

To ascertain the optical path length difference between the second surface s2 of the intransparent layer 3 and the second reference plane E2 from the measured optical path length difference mw2 between the object light reflected by the second surface s2 of the intransparent layer 3 and the reference light reflected by the second reference mirror 24, the path length difference r between the first reference mirror 23 and the second reference mirror 24 has to be taken into consideration:

$$a3+d2*n=mw2+r$$

The distance value a2 may in turn be computed from the measured optical path lengths a3+d2*n:

$$a2=a3+(mw2+r-a3)/n$$

and the thickness of the intransparent layer therefrom:

$$d1=a0-a1-a2$$

The distance value a1 between the first reference plane E1 and the first surface s1 of the intransparent layer 3 is determined by the first means for optical distance measurement, as described above with reference to FIG. 1.

The first means for optical distance measurement is preferably a chromatic-confocal means for distance measurement or an interferometric means for distance measurement.

What is claimed is:

1. A device for optical measurement of a thickness of an intransparent layer on a substrate, wherein the device comprises:
- first means for optical distance measurement, wherein the first means is configured to measure a first distance between a first reference plane and a first surface of the intransparent layer,
- second means for optical distance measurement, wherein the second means is configured to measure a second distance between a second reference plane and a second surface of the intransparent layer, wherein:
- the second means is further configured to measure a third distance between the second reference plane and a surface of the substrate,
- the device is configured to compute the thickness of the intransparent layer from the first distance and the second distance, and
- the device is configured to use the measurement of the third distance to take into account an influence of an optical effect, which is produced by the substrate, on the distance measurement of the second distance.

2. The device of claim 1, wherein the first means is a chromatic-confocal measuring device.

3. The device of claim 1, wherein the second means is an interferometric measuring device.

4. The device of claim 3, wherein the interferometric measuring device is a Fourier domain interferometer.

5. The device of claim 3, wherein the interferometric measuring device comprises two reference sections having different optical path lengths.

6. The device of claim 5, wherein the interferometric measuring device comprises a reference arm having a glass pane, wherein the two reference sections having different optical path lengths result in that two surfaces of the glass pane act as reference mirrors.

7. The device of claim 1, wherein the device is calibrated, and wherein the device is configured to determine a distance between the first reference plane and the second reference plane by means of a measurement of a calibration body of known thickness or of a transparent calibration body.

8. A method for optical measurement of a thickness of an intransparent layer on a substrate, wherein the method comprises the following steps:
- measuring a first distance between a first reference plane and a first surface of the intransparent layer;
- measuring a quantity that corresponds to an optical distance between a second reference plane and a second surface of the intransparent layer;
- measuring a third distance between a second reference plane and a surface of the substrate;
- computing a geometric second distance between a second reference plane and a second surface of the intransparent layer, thereby taking into account the quantity, the third distance and an index of refraction of the substrate;
- computing a layer thickness of the intransparent layer from the first distance and the second distance and a calibration variable that is a measure of the distance between the first reference plane and the second reference plane.

9. The method of claim 8, wherein the calibration variable is determined by measuring a calibration body of known thickness or a transparent calibration body.

* * * * *